(12) United States Patent
Haynes et al.

(10) Patent No.: US 9,130,919 B2
(45) Date of Patent: Sep. 8, 2015

(54) HOSTED IMS INSTANCE WITH AUTHENTICATION FRAMEWORK FOR NETWORK-BASED APPLICATIONS

(71) Applicants: VERIZON PATENT AND LICENSING, INC., Basking Ridge, NJ (US); CELLCO PARTNERSHIP, Basking Ridge, NJ (US)

(72) Inventors: Thomas W. Haynes, San Ramon, CA (US); Steven R. Rados, Danville, CA (US); Priscilla Lau, Fremont, CA (US); Patricia R. Chang, San Ramon, CA (US); Sagiv Draznin, Walnut Creek, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 166 days.

(21) Appl. No.: 13/651,764

(22) Filed: Oct. 15, 2012

(65) Prior Publication Data
US 2014/0109209 A1 Apr. 17, 2014

(51) Int. Cl.
*G06F 15/16* (2006.01)
*G06F 17/30* (2006.01)
*G06F 7/04* (2006.01)
*H04L 29/06* (2006.01)

(52) U.S. Cl.
CPC .............. *H04L 63/08* (2013.01); *H04L 63/0281* (2013.01); *H04L 63/105* (2013.01); *H04L 65/1016* (2013.01)

(58) Field of Classification Search
CPC ........ G06F 21/31; H04L 63/08; H04L 63/083
USPC .......... 713/168–174, 182–186, 202; 709/225, 709/229; 726/2–8
See application file for complete search history.

(56) References Cited

U.S. PATENT DOCUMENTS

2009/0100268 A1* 4/2009 Garcia et al. .................. 713/184
2013/0081123 A1* 3/2013 Przybysz et al. .................. 726/7

* cited by examiner

*Primary Examiner* — Evans Desrosiers

(57) ABSTRACT

A device is configured to receive an authentication credential from a user device, and is configured to authenticate the user device based on the authentication credential. The device is configured to transmit, based on authenticating the user device, a first application for establishing a tunnel that permits the user device to access a second application using an Internet protocol multimedia subsystem (IMS) network architecture. The device is configured to establish, based on the first application, a tunnel for transferring IMS traffic to or from the user device, and is configured to transfer the IMS traffic to or from the user device, using the tunnel, where transferring the IMS traffic permits the user device to access the second application.

20 Claims, 9 Drawing Sheets

| Authentication Type 510 | Access Type 520 |
|---|---|
| 510-1: Username/Password Validation | 520-1: Read Access |
| 510-2: SPC Validation | 520-2: Write Access |
| 510-3: SIM-based Validation | 520-3: Administrator Access |
| ... | ... |
| 510-X: Authentication type 510-X | 520-X: Access 520-X |

HOSTED IMS INSTANCE WITH AUTHENTICATION FRAMEWORK FOR NETWORK-BASED APPLICATIONS

BACKGROUND

Internet protocol (IP) multimedia subsystem (IMS) is a network architecture that provides multimedia service delivery based on standardized Internet protocols. IMS uses the Session Initiation Protocol (SIP) to establish, manage, and terminate IP communication sessions between end devices. The devices that provide the central functionality of IMS, such as authentication, session management, and traffic routing, are often referred to collectively as the IMS core.

BRIEF DESCRIPTION OF THE DRAWINGS

FIG. 5 is a diagram of an example data structure that stores information regarding authentication types and application access types;

DETAILED DESCRIPTION OF PREFERRED EMBODIMENTS

The following detailed description of example implementations refers to the accompanying drawings. The same reference numbers in different drawings may identify the same or similar elements.

Internet protocol (IP) multimedia subsystem (IMS) is a network architecture that permits multimedia service delivery based on standardized Internet protocols. IMS uses the Session Initiation Protocol (SIP) to establish, manage, and terminate IP communication sessions between end devices. IMS devices must register, authenticate, and determine the presence (e.g., availability and location) of a user device in order for the user device to be able to use IMS to communicate with other user devices. IMS devices may also provide other functions to manage communications of user devices, such as session management, routing management, billing management, etc.

In order for the user device to use IMS, the user device typically includes a thick client, with built-in IMS functionality, that understands IMS protocols and processes. Implementations described herein may allow devices, with little or no built-in IMS functionality, to utilize IMS to communicate with other devices.

Figure 1:
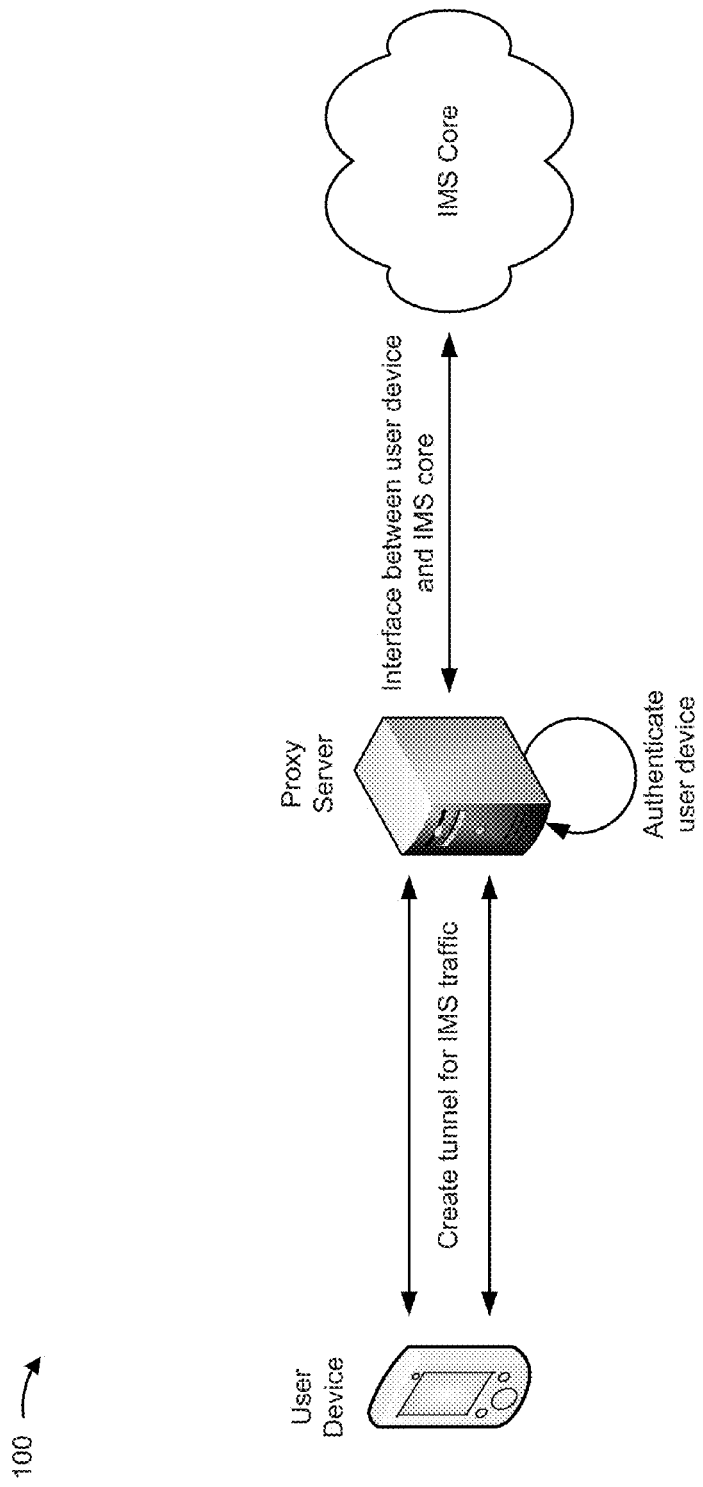
FIG. 1 is a diagram of an overview of an example implementation described herein.

FIG. 1 is a diagram of an overview 100 of an example implementation described herein. As illustrated in FIG. 1, the example implementation may include a user device, a proxy server, and an IMS core. In some implementations, the user device may be a mobile phone, the proxy server may be a server device, and the IMS core may include devices that provide IMS functionality.

As shown in FIG. 1, the proxy server may authenticate the user device. For example, the proxy server may authenticate the user device using an authentication technique other than those used by SIP, such as a username and password. Once the user device has been authenticated, the proxy server may create a tunnel, between the proxy server and the user device, for IMS traffic. For example, the proxy server may create a virtual private network (VPN) to transfer IMS traffic between the proxy server and the user device.

As further shown in FIG. 1, the proxy server may act as an interface between the user device and the IMS core by providing IMS functionality (e.g., functions provided by the IMS core) to the user device. For example, the proxy server may provide IMS authentication, session management, traffic routing, etc. By handling IMS traffic in this manner, functionality required for IMS communications may be stored on the proxy server, allowing the user device to utilize IMS even though the user device has little or no built-in IMS functionality.

Figure 2:
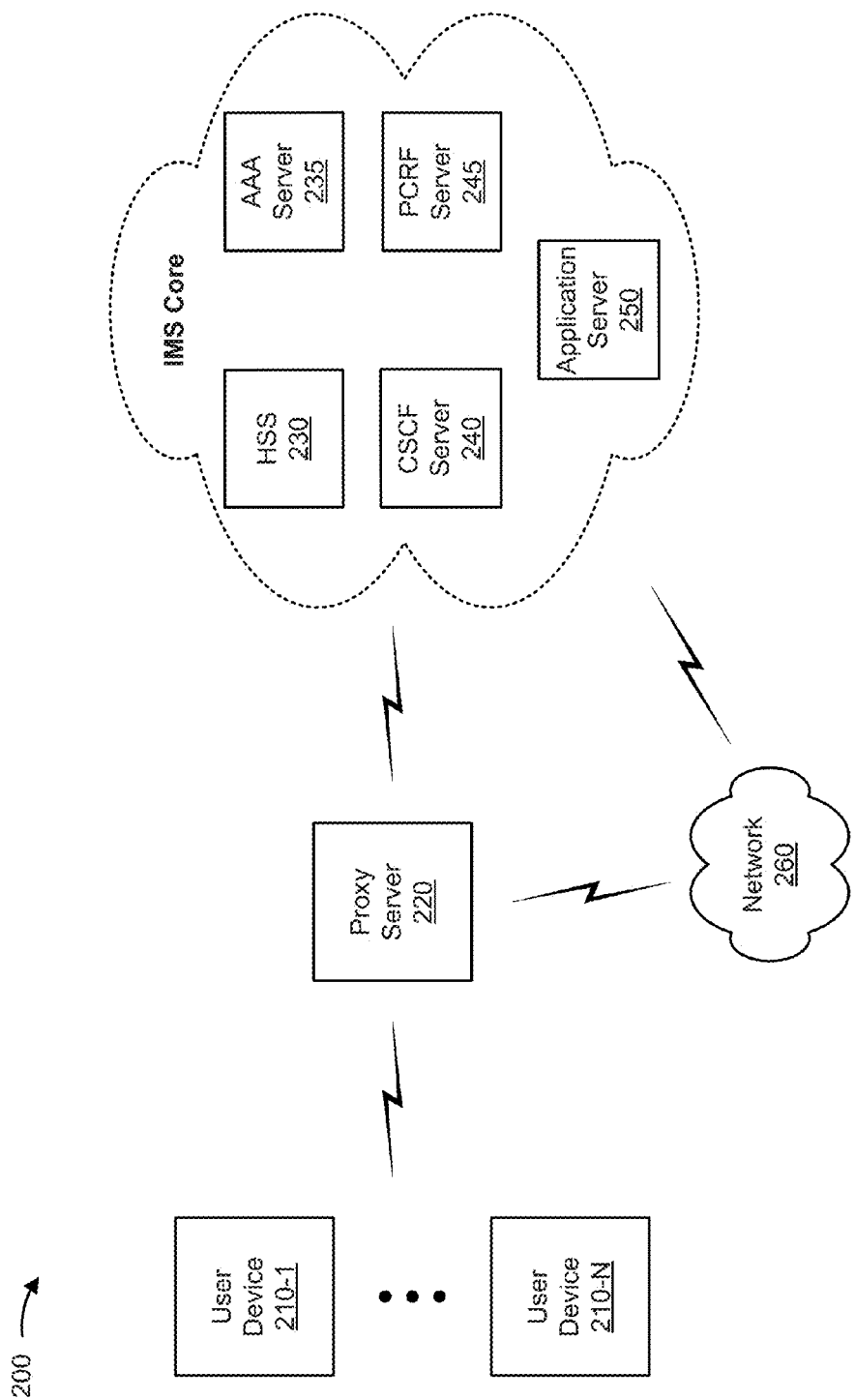
FIG. 2 is a diagram of an example environment in which systems and/or methods described herein may be implemented.

FIG. 2 is a diagram of an example environment 200 in which systems and/or methods described herein may be implemented. As illustrated in FIG. 2, environment 200 may include a set of user devices 210-1 through 210-N (N≥1) (hereinafter referred to collectively as "user devices 210," and individually as "user device 210"), a proxy server 220, a home subscriber server ("HSS") 230 (hereinafter referred to as "HSS 230"), an authentication, authorization, and accounting ("AAA") server 235 (hereinafter referred to as "AAA server 235"), a call session control function ("CSCF") server 240 (hereinafter referred to as "CSCF server 240"), a policy and charging rules function ("PCRF") server 245, (hereinafter referred to as "PCRF server 245"), an application server 250, and a network 260. As illustrated, HSS 230, AAA server 235, CSCF server 240, PCRF server 245, and application server 250 may be located within the IMS core. Additionally, or alternatively, the devices illustrated as being located within the IMS core may be distributed in any manner internal to or external to the IMS core (e.g., the devices may be included in network 260).

User device 210 may include any client device, such as a wired and/or wireless communication device, that is capable of communicating with proxy server 220. For example, user device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a computer (e.g., a desktop computer, a laptop computer, a tablet computer, etc.), a set-top box, a personal gaming system, and/or another type of client device. User device 210 may send traffic to and/or receive traffic from proxy server 220 (e.g., via a wired and/or wireless network).

Proxy server 220 may include a server device and/or another type of device, that gathers, processes, searches, stores, and/or provides information in a manner described herein. In some implementations, proxy server 220 may provide IMS functionality, and may transfer IMS traffic between user device 210 and another device by mimicking the functionality of IMS devices in the IMS core. For example, proxy server 220 may authenticate user device 210 and may create a tunnel, between user device 210 and proxy server 220, for IMS traffic. Additionally, or alternatively, proxy server 220 may route IMS traffic between user device 210 and another device (e.g., a device connected to network 260), based on information received from one or more devices shown in the IMS core. While shown as being located external to the IMS core, proxy server 220 may be implemented within the IMS core (e.g., within a device illustrated within the IMS core, or within another device in the IMS core) in some implementations.

HSS 230 and AAA server 235 may include one or more server devices, or other types of devices that gather, process, search, store, and/or provide information in a manner described herein. For example, HSS 230 may manage, update, and/or store, in a memory associated with HSS 230, profile information associated with user device 210 that identifies applications and/or services that are permitted for use by and/or accessible by user device 210, information associated with a user of user device 210 (e.g., a username, a password, a personal identification number ("PIN"), etc.), subscription information, rate information, minutes allowed, bandwidth allocation policy information, and/or other information. AAA server 235 may include a device that performs authentication, authorization, and/or accounting operations associated with a communication session associated with user device 210. Additionally, or alternatively, HSS 230 and/or AAA server 235 may provide information to proxy server 220 so that proxy server 220 may perform the functions described herein as being performed by HSS 230 and/or AAA server 235. In some implementations, HSS 230 and AAA server 235 may be implemented within the same server device, or within a collection of server devices.

CSCF server 240 may include one or more server devices, or other types of devices that gather, process, search, store, and/or provide information in a manner described herein. In some implementations, CSCF server 240 may process and/or route calls to and from user device 210 and/or another device (e.g., in network 260). Additionally, or alternatively, CSCF server 240 may provide information to proxy server 220 so that proxy server 220 may process calls to/from user device 210 and/or another device.

PCRF server 245 may include one or more server devices, or other types of devices that gather, process, search, store, and/or provide information in a manner described herein. In some implementations, PCRF server 245 may establish quality of service and charging (e.g., packet accounting) rules for a communication session based on committed quality of service levels per subscriber, per user device 210, per service type, per application, etc. PCRF server 245 may receive input (e.g., from the IMS core) regarding users, user devices 210, subscriptions, and/or applications. PCRF server 245 may create quality of service and charging policy rules for a session (e.g., for a user, a subscriber, a user device 210, an application, etc.), and may provide the policy rules to proxy server 220, which may handle a session with a particular user device 210 based on the policy rules.

Application server 250 may include one or more server devices, or other types of devices that gather, process, search, store, and/or provide information in a manner described herein. Application server 250 may host and execute applications and/or services, such as IMS services. For example, application server 250 may include a telephony application server, a video server, a media server, etc. In some implementations, application server 250 may be located external to the IMS core. Proxy server 220 may manage communications between application server 250 and user device 210.

Network 260 may include one or more wired and/or wireless networks. For example, network 260 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 260 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Proxy server 220 may route traffic through network 260 based on information received from devices in the IMS core.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
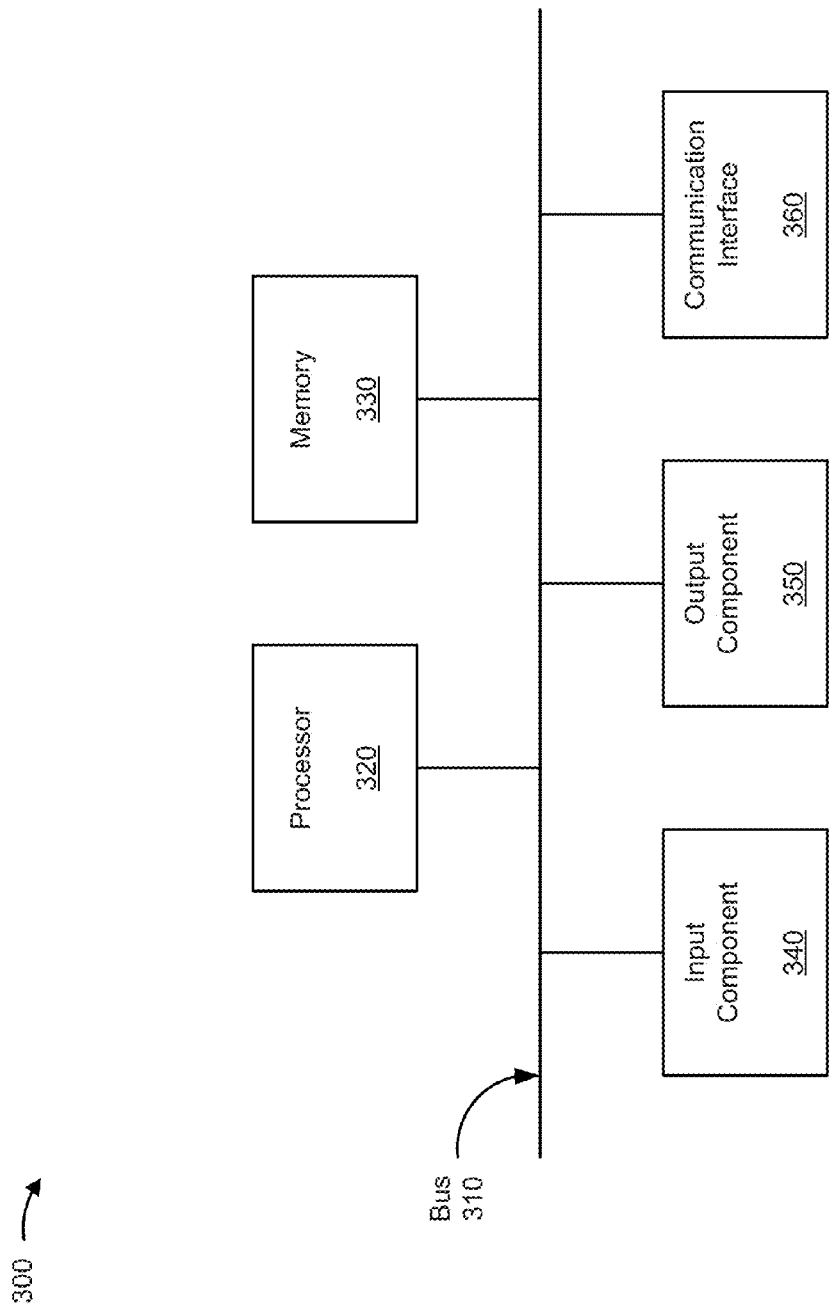
FIG. 3 is a diagram of example components of one or more devices of FIG. 2.

FIG. 3 is a diagram of example components of a device 300. Device 300 may correspond to user device 210, proxy server 220, HSS 230, AAA server 235, CSCF server 240, PCRF server 245, and/or application server 250. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include a component that permits a user to input information to device 300 (e.g., a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of user device 210, proxy server 220, HSS 230, AAA server 235, CSCF server 240, PCRF server 245, and/or application server 250 may include one or more devices 300 and/or one or more components of device 300.

Figure 4:
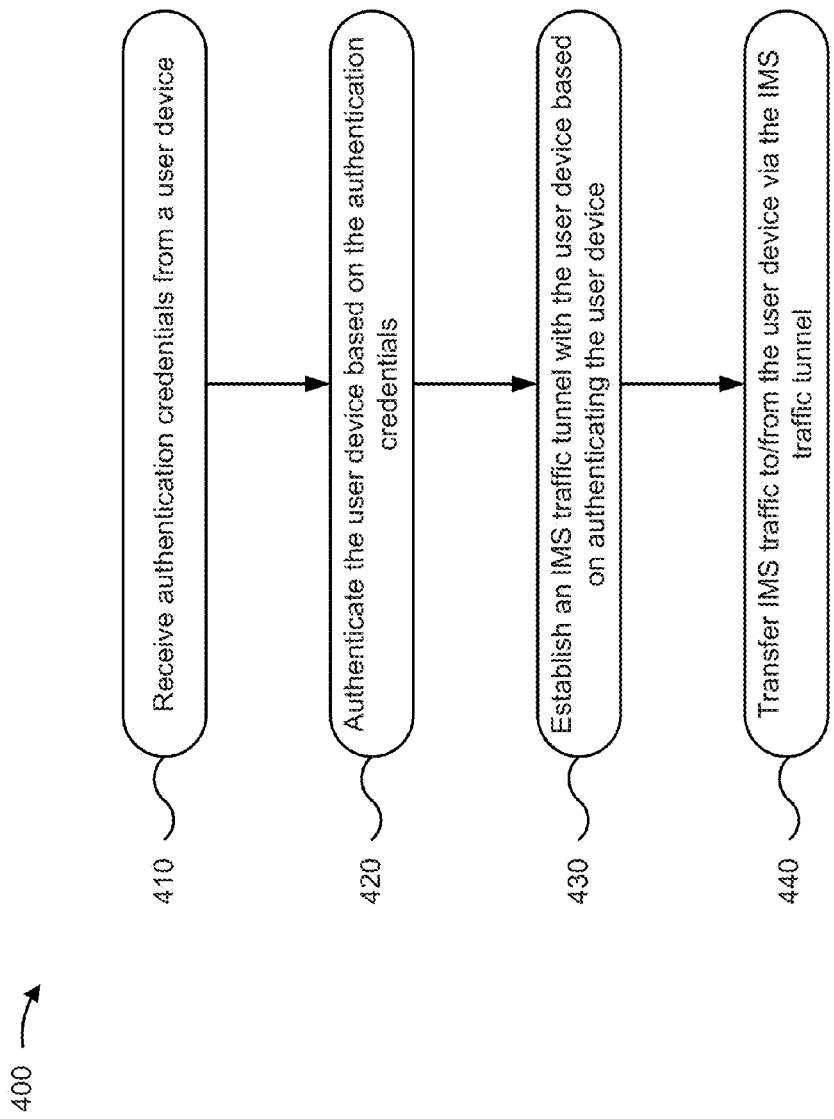
FIG. 4 is a diagram of an example process for establishing a tunnel for IMS communications with a device that lacks IMS functionality.

FIG. 4 is a diagram of an example process 400 for establishing a tunnel for IMS communications with a device that lacks IMS functionality. In some implementations, one or more process blocks of FIG. 4 may be performed by one or more components of proxy server 220. Additionally, or alternatively, one or more process blocks of FIG. 4 may be performed by one or more components of another device or a collection of devices including or excluding proxy server 220.

As shown in FIG. 4, process 400 may include receiving authentication credentials from a user device (block 410). In some implementations, proxy server 220 may receive authentication credentials from user device 210. The authentication credentials may include, for example, a username and/or password (e.g., a personal identification number (PIN)), a device and/or subscriber identifier (e.g., a service programming code (SPC), a master subsidy lock (MSL), an international mobile equipment identity (IMEI), an international mobile subscriber identity (IMSI), a mobile equipment identifier (MEID), etc.), a subscriber identity module (SIM)-based credential (e.g., IMS authentication and key agreement (AKA), evolved packet system (EPS) authentication and key agreement (AKA), generic bootstrapping architecture (GBA) authentication, universal integrated circuit card (UICC) information, etc.), a cryptographic algorithm (e.g., the RSA algorithm, two-factor authentication, etc.), and/or another type of authentication credential. Proxy server 220 may grant, to user device 210, different levels of access to an IMS application based on the authentication credentials received from user device 210.

As further shown in FIG. 4, process 400 may include authenticating the user device based on the authentication credentials (block 420). For example, proxy server 220 may compare the authentication credentials, received from user device 210, to access information stored in memory, in order to determine whether to grant IMS application access to user device 210. In some implementations, the access information may be stored by an IMS device in the IMS core (e.g., HSS 230, AAA server 235, CSCF server 240, etc.). For example, proxy server 220 may provide the authentication credentials to the IMS device, and may receive an indication, from the IMS device, of whether to grant IMS access to user device 210. Additionally, or alternatively, proxy server 220 may store the access information. For example, proxy server 220 may receive the access information from an IMS device, and may compare the authentication credentials from user device 210 to the access information in order to determine whether to grant IMS access to user device 210.

In some implementations, proxy server 220 may grant user device 210 different levels of access to an IMS application based on the authentication credentials. For example, proxy server 220 may grant read access, for an IMS application, to user device 210 based on receiving a valid username and/or password from user device 210. Additionally, or alternatively, proxy server 220 may grant write access, for an IMS application, to user device 210 based on receiving a valid service programming code (SPC) from user device 210.

In some implementations, authenticating user device 210 may include determining presence information associated with user device 210. For example, proxy server 220 may determine a geographic location of user device 210 (e.g., using global positioning system (GPS) information, cellular tower triangulation, etc.). Proxy server 220 may use the presence information for authentication, for providing services to user device 210, and/or for emergency services (e.g., 9-1-1 calls).

Returning to FIG. 4, process 400 may include establishing an IMS traffic tunnel with the user device based on authenticating the user device (block 430). In some implementations, proxy server 220 may establish a tunnel, between proxy server 220 and user device 210, for exchanging IMS traffic. For example, the tunnel may be a virtual private network (VPN) connection, a secure socket layer (SSL) connection, a hypertext transfer protocol secure (HTTPS) connection, etc. In some implementations, proxy server 220 may establish the IMS traffic tunnel for a particular session of user device 210, and may terminate the tunnel when the session is terminated (e.g., when a user of user device 210 logs off, when user device 210 is inactive for a particular amount of time, etc.). Additionally, or alternatively, proxy server 220 may maintain an access level granted to user device 210 for a session until the session is terminated. In other words, proxy server 220 may grant a particular level of access to user device 210, for a session, based on the authentication credentials received for that session (e.g., when proxy server 220 establishes the session).

In some implementations, proxy server 220 may provide an application to user device 210 in order to establish the IMS traffic tunnel. For example, proxy server 220 may provide an application, such as a reusable software component (e.g., an ActiveX control, a Java applet, etc.), to user device 210, and the application may be used to establish the IMS traffic tunnel. Proxy server 220 may utilize the application to permit user device 210 to register with the IMS core, make and receive calls via the IMS core, and/or transmit and receive IMS traffic. By allowing IMS access in this manner, proxy server 220 allows a subscriber to access subscribed-to IMS services from any user device 210.

As further shown in FIG. 4, process 400 may include transferring IMS traffic to and/or from the user device via the IMS traffic tunnel (block 440). For example, proxy server 220 may receive traffic from user device 210 via the IMS traffic tunnel, and may route the traffic to an appropriate destination device (e.g., via network 260) based on control plane information (e.g., information that controls traffic routing). Additionally, or alternatively, proxy server 220 may receive traffic from another device (e.g., via another tunnel, via the IMS core, via network 260, etc.), and may route the traffic to user device 210, via the IMS traffic tunnel, based on control plane information.

In some implementations, the control plane information may be stored by an IMS device (e.g., CSCF server 240), and proxy server 220 may receive routing instructions from the IMS device (e.g., based on providing application information, user device information, authentication information, user/subscriber information, etc. to the IMS device). Additionally, or alternatively, proxy server 220 may store the control plane information. For example, proxy server 220 may receive the control plane information from the IMS device, and may route IMS traffic to and/or from user device 210 based on the control plane information.

While a series of blocks has been described with regard to FIG. 4, the order of the blocks may be modified in some implementations. Additionally, or alternatively, non-dependent blocks may be performed in parallel.

FIG. 5 is a diagram of an example data structure 500 that stores information regarding authentication types and application access types. Data structure 500 may be stored in a memory device (e.g., a RAM, a hard disk, etc.), associated with one or more devices shown in FIG. 2. For example, data structure 500 may be stored by proxy server 220 and/or a device in the IMS core.

Data structure 500 may include a collection of fields, such as an authentication type field 510 and an access type field 520.

Authentication type field 510 may store information that identifies an authentication type that may be used by proxy server 220 to grant user device 210 access to an IMS application. For example, an authentication type may include username/password validation (as shown in field 510-1), SPC validation (as shown in field 510-2), SIM-based validation (as shown in field 510-3), and/or other types of authentication (as shown in field 510-X).

Additionally, or alternatively, authentication type field 510 may store authentication credentials that may be used to grant user device 210 access to an application. For example, field 510-1 may store a particular username and associated password that allows user device 210 to access the application. Similarly, field 510-2 may store a particular service programming code (SPC) that allows user device 210 to access the application.

Access type field 520 may store information that identifies an access type that may be granted, by proxy server 220, to user device 210 based on authenticating user device 210 using the authentication type stored in authentication type field 510. For example, an access type may include read access (as shown in field 520-1), write access (as shown in field 520-2), administrator access (as shown in field 520-3), and/or other types of access (as shown in field 520-X). For example, read access may allow a user of user device 210 to use an application, write access may allow a user of user device 210 to edit the application, and administrator access may allow a user of user device 210 to access and edit secure portions of the application.

Read access, write access, and administrator access are described for explanatory purposes. Other access types may include access types that allow a user to access, use, and/or edit different parts and/or functions of an application. In some implementations, the access types may be hierarchical in nature, with more secure authentication credentials permitting access to a particular access type, and all access types below the particular access type in the hierarchy. For example, a user with write access may be granted read access, and a user with administrator access may be granted read access and write access.

Information associated with an authentication type and an access type may be conceptually represented as a row in data structure 500. For example, the first row in data structure 500 may correspond to a "username/password validation" authentication type, which may grant "read access" to user device 210. Thus, when proxy server 220 authenticates user device 210 using a username and password, user device 210 may be granted read access to an application. Similarly, as shown in the second row of data structure 500, when proxy server 220 authenticates user device 210 using a service programming code, user device 210 may be granted write access to the application. In some implementations, the quantity and/or type of authentication and/or access may depend on the application to be accessed.

The number of fields illustrated in FIG. 5 is provided for explanatory purposes. In practice, data structure 500 may include additional fields, fewer fields, different fields, or differently arranged fields than those illustrated in FIG. 5. For example, data structure 500 may store information regarding additional, fewer, and/or different authentication types and/or access types than illustrated in FIG. 5. Furthermore, while data structure 500 is represented as a table with rows and columns, in practice, data structure 500 may include any type of data structure, such as a linked list, a tree, a hash table, a database, or another type of data structure. In some implementations, data structure 500 may include information generated by a device and/or a component. Additionally, or alternatively, data structure 500 may include information provided from another source, such as information provided by a user, and/or information automatically provided by a device.

Figure 6A:
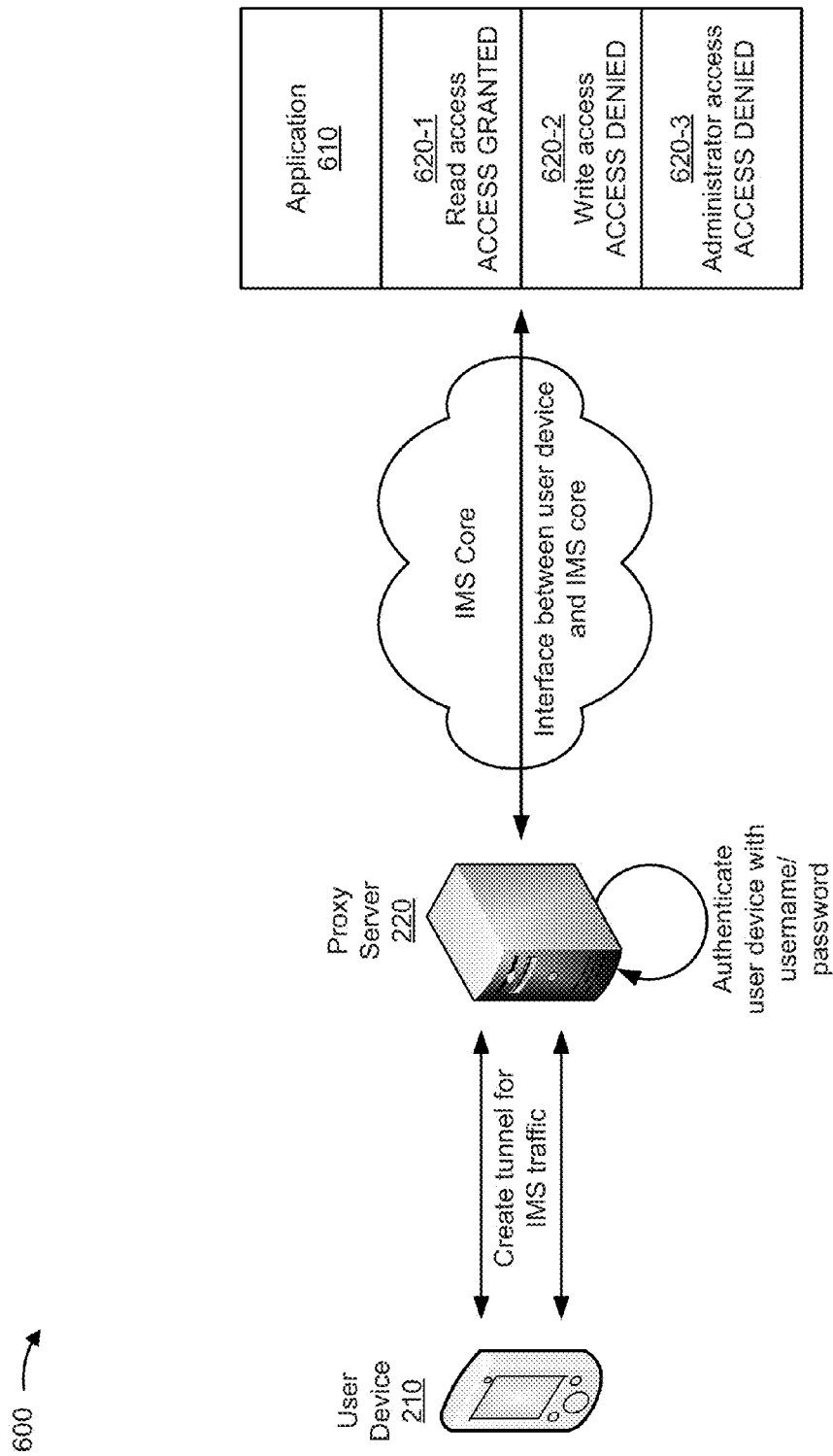
FIGS. 6A and 6B are diagrams of example implementations relating to the process shown in FIG. 4.
Figure 6B:
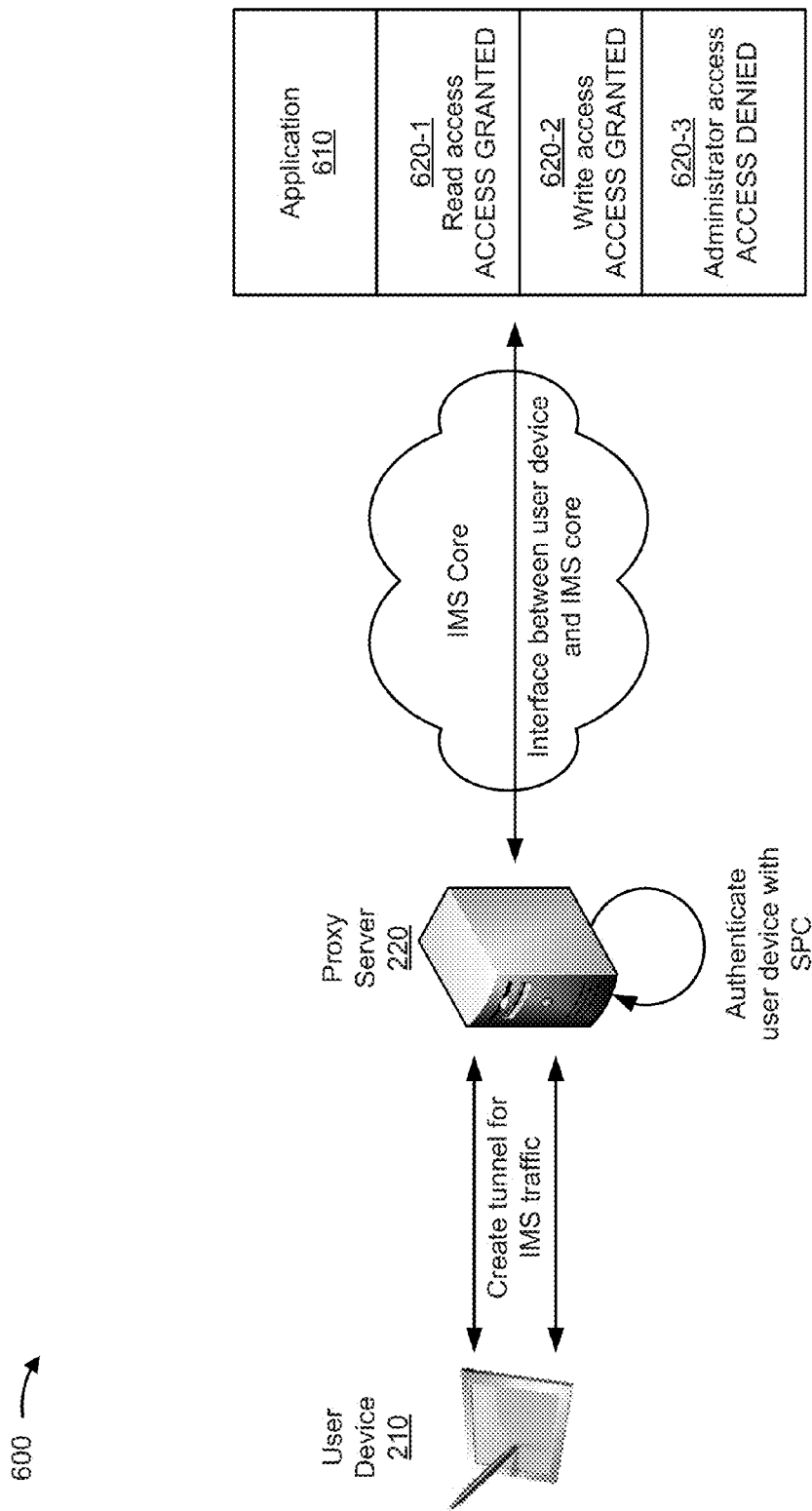

FIGS. 6A and 6B are diagrams of example implementations 600 relating to process 400, shown in FIG. 4. FIG. 6A shows an example implementation where user device 210 is granted read access to an application 610 based on authentication, by proxy server 220, using a username and password. FIG. 6B shows an example implementation where user device 210 is granted write access to application 610 based on authentication, by proxy server 220, using SPC validation.

As shown in FIG. 6A, user device 210 may seek access to application 610. Access to application 610 may be controlled by one or more devices in the IMS core. The functionality of the devices in the IMS core may be performed by proxy server 220. For example, proxy server 220 may receive authentication credentials from user device 210, such as a username and password. Proxy server 220 may authenticate user device 210 using the authentication credentials. For example, proxy server 220 may receive (e.g., from AAA server 235) and/or store access information, and may authenticate user device 210 by comparing the authentication credentials to the access information. Based on authenticating user device 210, proxy server 220 may create a tunnel, between proxy server 220 and user device 210, for communicating IMS traffic to and/or from user device 210.

As further shown in FIG. 6A, proxy server 220 may grant user device 210 different levels of access to application 610, based on the authentication credentials. For example, application 610 may provide three different levels of access, such as read access 620-1, write access 620-2, and administrator access 620-3, as illustrated. Based on authenticating user device 210 using a username and password, proxy server 220 may grant read access 620-1 to user device 210 for application 610, as illustrated. As further shown in FIG. 6A, proxy server 220 may deny write access 620-2 and administrator access 620-3 to user device 210 for application 610 based on authenticating user device 210 using a username and password.

As shown in FIG. 6B, proxy server 220 may receive another type of authentication from user device 210, such as service programming code (SPC) authentication. Based on authenticating user device 210 using SPC authentication, proxy server 220 may grant read access 620-1 and write access 620-2 to user device 210 for application 610, as illustrated. As further shown in FIG. 6B, proxy server 220 may deny administrator access 620-3 to user device 210 for application 610 based on authenticating user device 210 using SPC authentication.

The information illustrated in FIGS. 6A and 6B, such as the authentication type, the access type, and the quantity of access types, is provided for explanatory purposes. In practice, implementation 600 may include additional information, less information, or different information than illustrated in FIGS. 6A and 6B.

Figure 7A:
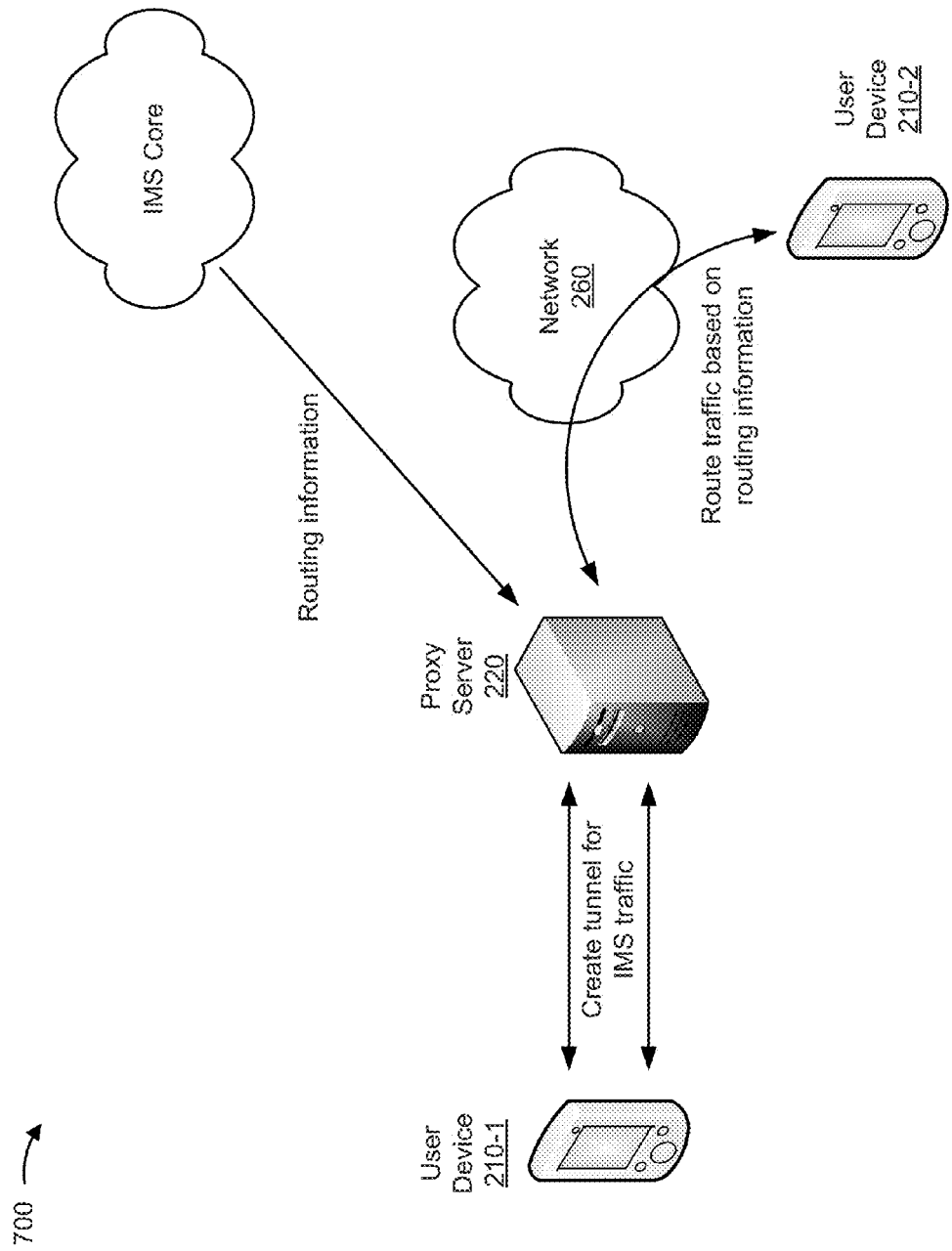
FIGS. 7A and 7B are diagrams of example implementations relating to the process shown in FIG. 4.
Figure 7B:
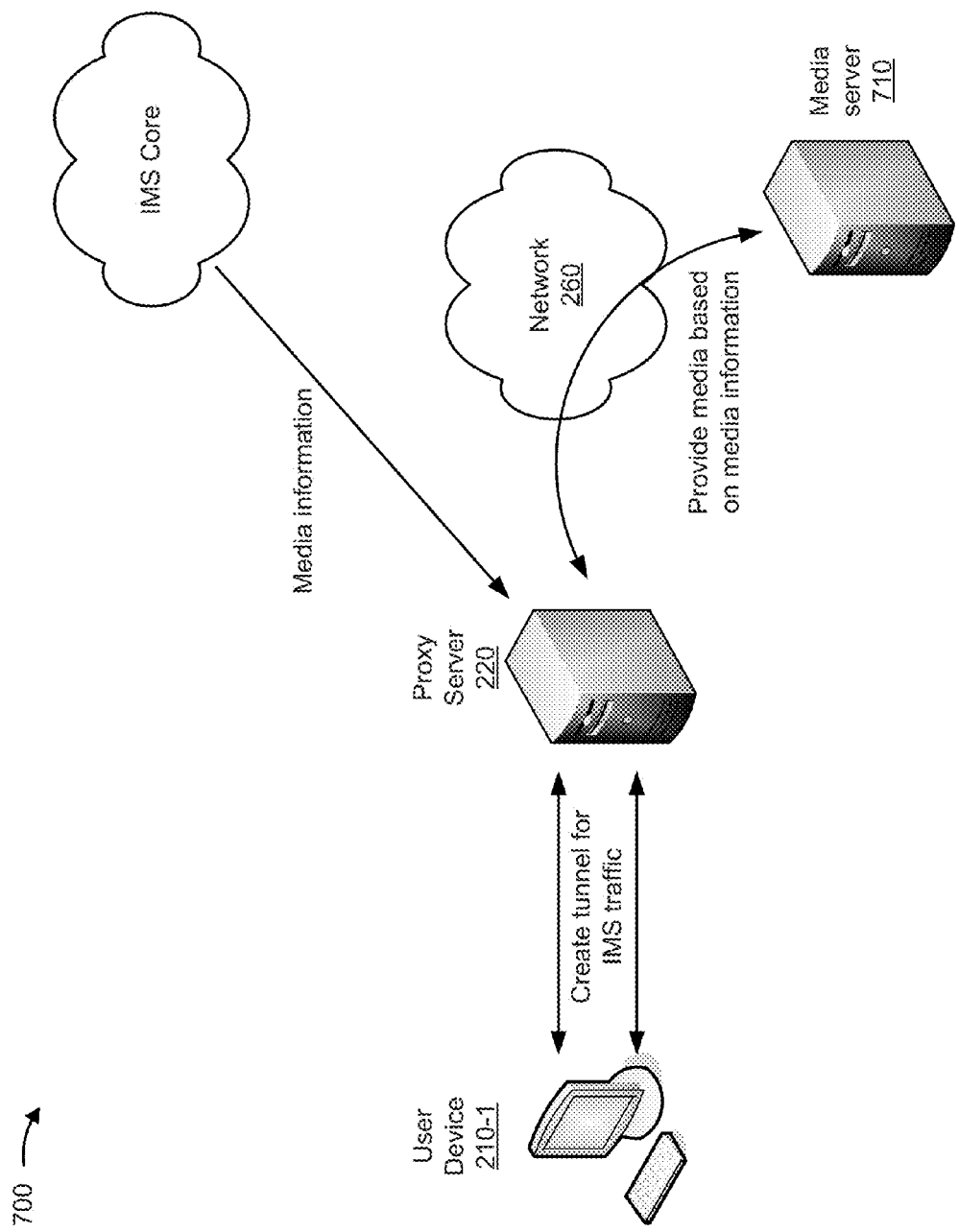

FIGS. 7A and 7B are diagrams of example implementations 700 relating to process 400, shown in FIG. 4. FIG. 7A shows an example implementation where proxy server 220 routes traffic between user devices 210 based on routing information received from the IMS core. FIG. 7B shows an example implementation where proxy server 220 provides media from a media server 710 to user device 210 based on media information received from the IMS core.

As shown in FIG. 7A, proxy server 220 may authenticate user device 210-1, and may create an IMS traffic tunnel between proxy server 220 and user device 210-1, as described elsewhere herein. User device 210-1 may attempt to communicate with another user device 210-2. As further shown in FIG. 7A, proxy server 220 may receive routing information from the IMS core, and may use the routing information to route traffic between user device 210-1 and user device 210-2.

In some implementations, user device 210-2 may include built-in IMS functionality, and the routing information may include information for routing traffic over network 260, to which user device 210-2 may be connected. Alternatively, user device 210-2 may not include IMS functionality, and proxy server 220 may also establish an IMS traffic tunnel between proxy server 220 and user device 210-2. Proxy server 220 may tunnel traffic between user device 210-1 and user device 210-2 using the created IMS traffic tunnels.

As shown in FIG. 7B, proxy server 220 may authenticate user device 210-1, and may create an IMS tunnel between proxy server 220 and user device 210-1, as described elsewhere herein. User device 210-1 may attempt to access media (e.g., audio, video, streaming information, etc.), provided by, for example, media server 710 (which may correspond to application server 250). As further shown in FIG. 7B, proxy server 220 may receive media information from the IMS core, and may use the media information to provide the media from media server 710 to user device 210-1. In some implementations, the media information may include routing information, an indication of a data rate at which the media is to be provided to user device 210-1, or other information that may facilitate the routing of the media information to user device 210-1.

The information illustrated in FIGS. 7A and 7B is provided for explanatory purposes. In practice, implementation 700 may include additional information, less information, and/or different information than illustrated in FIGS. 7A and 7B.

Implementations described herein may allow devices, with little or no built-in IMS functionality, to utilize IMS to communicate with other devices via a proxy server.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors, implemented at least partially in hardware, to:
  receive an authentication credential from a user device;
  authenticate the user device based on the authentication credential;
  transmit, based on authenticating the user device, a first application for establishing a tunnel that enables the user device to access a second application using an Internet protocol multimedia subsystem (IMS) network architecture,
    the second application being associated with a plurality of access types,
      each access type, of the plurality of access types, providing the user device with a corresponding level of access, of a plurality of levels of access, to the second application when the access type is granted to the user device,
      the one or more processors being to:
        grant the access type to the user device based on the authentication credential;
  establish, based on the first application, the tunnel, between the device and the user device, for transmitting IMS traffic between the device and the user device;
  provide, based on establishing the tunnel, an IMS functionality to the user device;
  receive the IMS traffic from the user device, using the tunnel,
    the device acting as an interface between the user device and an IMS core by providing the IMS functionality to the user device,
    the device acting as the interface permitting the user device to access the second application; and
  route the IMS traffic to another user device,
    when the other user device does not include the IMS functionality, the one or more processors, when routing the IMS traffic are to:
      establish another tunnel between the device and the other user device, and route the IMS traffic to the other user device via the other tunnel.

2. The device of claim 1, where the authentication credential comprises at least one of:
   a username and a password;
   a service programming code; or
   a subscriber identity module-based credential.

3. The device of claim 2, where the one or more processors, when granting the access type, are to:
   grant the access type based on whether the authentication credential is the username and the password, the service programming code, or the subscriber identity module-based credential.

4. The device of claim 1, where the one or more processors, when granting the access type, are to:
   grant the access type for a duration of a session associated with the tunnel between the device and the user device; and
   terminate the access type for the user device when the session is terminated.

5. The device of claim 1, where the one or more processors, when establishing the tunnel, are to:
   establish, between the device and the user device, at least one of:
      a virtual private network connection;
      a secure socket layer connection; or
      a hypertext transfer protocol secure connection.

6. The device of claim 1, where the one or more processors, when routing the IMS traffic, are to:
   receive, from an IMS device associated with the IMS network architecture, routing information; and
   route the IMS traffic to the other user device based on the routing information.

7. The device of claim 1, where the user device does not include built-in IMS functionality independent of the first application, and
   where the first application permits the user device to communicate using one or more of:
      an IMS protocol, or
      an IMS process.

8. A method, comprising:
   receiving, by a proxy device, an authentication credential from a user device;
   authenticating, by the proxy device, the user device based on the authentication credential;
   transmitting, by the proxy device and based on authenticating the user device, a first application for establishing a tunnel that enables the user device to access a second application using an Internet protocol multimedia subsystem (IMS) network architecture,
      the second application being associated with a plurality of access types,
         each access type, of the plurality of access types, permitting the user device to interact with the second application in a different manner when the access type is granted to the user device
         the method further comprising:
            granting the access type to the user device based on a type of authentication credential associated with the authentication credential;
   establishing, by the proxy device and based on the first application, the tunnel, between the proxy device and the user device, for transferring IMS traffic between the user device and the proxy device;
   providing, by the proxy device and based on establishing the tunnel, an IMS functionality to the user device;
   receiving, by the proxy device, the IMS traffic from the user device, using the tunnel,
      the proxy device acting as an interface between the user device and an IMS core by providing the IMS functionality to the user device,
      the proxy device acting as the interface permitting the user device to access the second application; and
   routing, by the proxy device, the IMS traffic to another user device, the routing the IMS traffic including:
      when the other user device does not include the IMS functionality:
         establishing another tunnel between the proxy device and the other user device, and routing the IMS traffic to the other user device via the other tunnel.

9. The method of claim 8, where the authentication credential comprises at least one of:
   a username and a password;
   a service programming code; or
   a subscriber identity module-based credential.

10. The method of claim 9, where granting the access type comprises: granting the access type based on whether the authentication credential is the username and the password, the service programming code, or the subscriber identity module-based credential.

11. The method of claim 8, where granting the access type comprises:
    granting the access type for a duration of a session associated with the tunnel; and
    terminating the access type for the user device when the session is terminated.

12. The method of claim 8, where establishing the tunnel comprises:
    establishing, between the proxy device and the user device, at least one of:
       a virtual private network connection;
       a secure socket layer connection; or
       a hypertext transfer protocol secure connection.

13. The method of claim 8, where routing the IMS traffic comprises:
    receiving, from an IMS device associated with the IMS network architecture, routing information; and
    routing the IMS traffic to the other user device based on the routing information.

14. The method of claim 8, where the user device does not include built-in IMS functionality independent of the first application, and
    where the first application permits the user device to communicate using one or more of:
       one or more IMS protocols, or
       one or more IMS processes.

15. A non-transitory computer-readable medium storing instructions, the instructions comprising:
    one or more instructions that, when executed by a processor of a server, cause the processor to:
       receive an authentication credential from a user device;
       authenticate the user device based on the authentication credential;
       transmit, based on authenticating the user device, a first application for establishing a tunnel that enables the user device to access a second application using an Internet protocol multimedia subsystem (IMS) network architecture,
          the second application being associated with a plurality of access types,
             each access type, of the plurality of access types, permitting the user device to interact with the second application in a different manner when the access type is granted to the user device,
the instructions further including one or more instructions to grant the access type to the user device based on the authentication credential;
establish, based on the first application, the tunnel, between the server and the user device, for transmitting IMS traffic between the server and the user device;
receive the IMS traffic from the user device via the tunnel,
the server acting as an interface between the user device and an IMS core when transmitting the IMS traffic between the server and the user device,
the server acting as the interface enabling the user device to access the second application, and
the user device not including IMS functionality independent of the first application; and
route the IMS traffic to another user device,
when the other user device does not include the IMS functionality, the one or more instructions to route the IMS traffic include:
one or more instructions that, when executed by the processor, cause the processor to:
establish another tunnel between the device and the other user device, and
route the IMS traffic to the other user device via the other tunnel.

16. The non-transitory computer-readable medium of claim 15, where the authentication credential comprises at least one of:
a username and a password;
a service programming code; or
a subscriber identity module-based credential; and
where the one or more instructions to grant the access type include:
one or more instructions that, when executed by the processor, cause the processor to:
grant the access type based on whether the authentication credential is the username and the password, the service programming code, or the subscriber identity module-based credential.

17. The non-transitory computer-readable medium of claim 15, where the one or more instructions to grant the access type include:
one or more instructions that, when executed by the processor, cause the processor to:
grant the access type for a duration of a session associated with the tunnel; and
terminate the access type for the user device when the session is terminated.

18. The non-transitory computer-readable medium of claim 15, where the one or more instructions to establish the tunnel include:
one or more instructions that, when executed by the processor, cause the processor to:
establish at least one of:
a virtual private network connection;
a secure socket layer connection; or
a hypertext transfer protocol secure connection.

19. The non-transitory computer-readable medium of claim 15, where the one or more instructions to route the IMS traffic include:
one or more instructions that, when executed by the processor, cause the processor to:
receive, from an IMS device associated with the IMS network architecture, routing information; and
route the IMS traffic to the other user device based on the routing information.

20. The non-transitory computer-readable medium of claim 15, where the user device does not include built-in IMS functionality independent of the first application, and
where the first application permits the user device to communicate using one or more of:
an IMS protocol, or
an IMS process.

* * * * *